A. P. COCHRANE.
COUPLING.
APPLICATION FILED JULY 18, 1913.

1,098,426.

Patented June 2, 1914.

Witnesses:
Ben Brooks.
Warren E. Willis.

Inventor
Albert P. Cochrane.
By his Attorney F. V. Winter

UNITED STATES PATENT OFFICE.

ALBERT P. COCHRANE, OF NEW YORK, N. Y.

COUPLING.

1,098,426.

Specification of Letters Patent.

Patented June 2, 1914.

Application filed July 18, 1913. Serial No. 779,730.

*To all whom it may concern:*

Be it known that I, ALBERT P. COCHRANE, a citizen of the United States, and a resident of New York, in the county and State of the same name, have invented certain new and useful Improvements in Couplings, of which the following is a specification.

This invention relates to improvements in couplings and particularly to that class used in connection with gas hose where it is joined to metal pipes and for other similar purposes where a slip joint is desired.

Figures 1, 2:
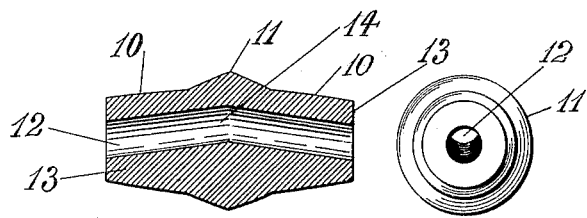
Figures 3, 4:
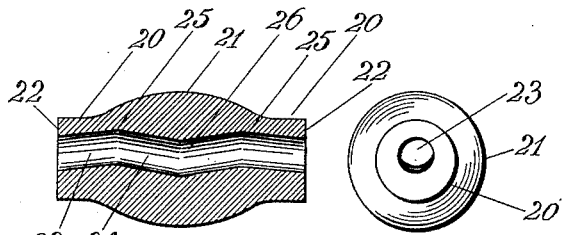
Figure 7:
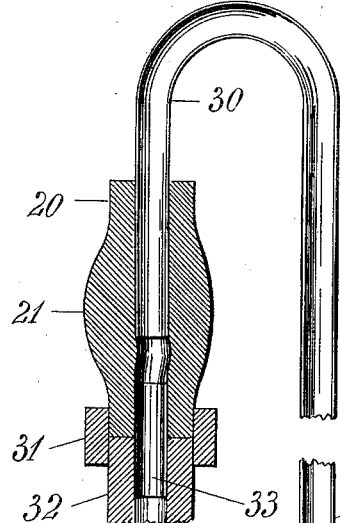
Figures 5, 6:
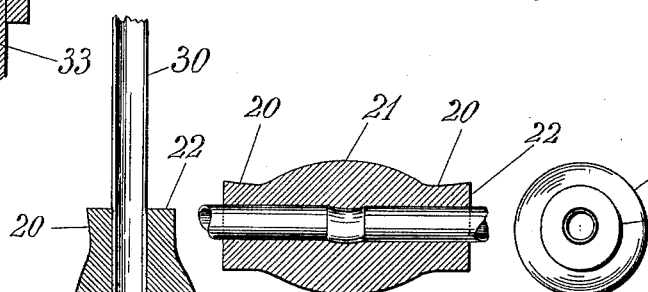

The object of the invention is to provide means whereby such connecting joints can be quickly and easily made without the use of tools or special appliances and which will hold the united parts safely and securely together until manually disassociated and in such manner as to avoid leakage of the matter transmitted through the connected tubular elements. This and other objects are attained by the novel construction of parts hereinafter described and shown in the accompanying drawing forming part of this specification, and in which:

Figure 1 is a transverse longitudinal section showing the interior construction of the invention in its simplest form. Fig. 2 is an end view of the same. Fig. 3 is a view similar to that shown in Fig. 1 but showing a modified construction. Fig. 4 is an end view of the same. Fig. 5 is a longitudinal sectional view of the same, showing its application in connecting tubular elements. Fig. 6 is an end view of the same. Fig. 7 is a similar sectional view showing the device connecting a "goose-neck" with a gas hose, and, Fig. 8 is another like view showing its application.

The invention consists of a flexible elastic sleeve preferably of rubber molded into the shape shown, which is essentially conical at the ends 10, with an enlarged center portion 11 and having a passage 12 longitudinally therethrough, the same being substantially central at the extreme ends 13 and extending diagonally to the center forming an obtuse angle 14; if the coupling thus formed be attached at one end to a suitable hose or tube and slipped over a close fitting straight rigid tube at the other so that the tube will extend some distance past the apex 14, it will cause the coupling to assume a shape in which the passage is nearly or quite straight and adhere securely to the tube.

In the other form shown in Figs. 3 to 8 inclusive, the sleeve is indicated to have cylindrical ends 20 with a bulbed center 21 having extending substantially central of its length between the extreme ends 22 a sinuous passage comprised of angularly disposed tubular openings 23 connecting with others 24 so as to form in effect a doubled obtuse angle at 25 and 26. As seen in Fig. 5, when a rigid tube is entered beyond the points 24 they will be held substantially parallel and in alinement.

Figure 8:
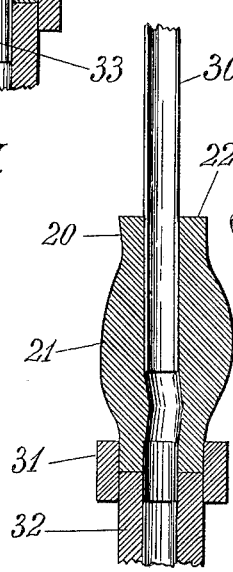

The application is indicated in Figs. 7 and 8 to a common form of "goose-neck" 30 connection, as from a chandelier, the opposite end of the coupling being secured by the sleeve 31 to a flexible gas tube 32, having a thin metal 33 inserted between, and extending to a drop light, heater or the like. The "goose-neck" is inserted into the passage in the coupling past the juncture of the angularly disposed portions of said passage, thereby deforming said coupling and causing the same to firmly grip the "goose-neck." I am aware that rubber sleeves or sockets have long been used for like purposes but these have had a straight passage and lack the gripping properties of a coupling made in accordance with my invention, therefore

I claim:

1. A coupling of the class described comprising a yielding tubular member having a passage of substantially constant diameter extending therethrough and opening at its opposite ends on the longitudinal median line of said member, one portion of said passage being disposed at an angle to the other, whereby a rigid tube of the same diameter as said passage when inserted in said passage past the junction of the angularly disposed portions of the same will deform the tubular member and cause the same to firmly grip the tube.

2. A coupling of the class described, comprising a yielding tubular member provided with an enlarged center portion and containing a sinuous passage-way, having two or more distinct angles formed therein.

In testimony whereof I have signed my name to this specification in the presence of two subscribing witnesses.

ALBERT P. COCHRANE.

Witnesses:
WARREN E. WILLIS,
BEN BROOKS.

Copies of this patent may be obtained for five cents each, by addressing the "Commissioner of Patents, Washington, D. C."